(12) United States Patent
Wu et al.

(10) Patent No.: US 8,552,673 B2
(45) Date of Patent: Oct. 8, 2013

(54) INTERIOR PERMANENT MAGNET MACHINE SYSTEMS AND METHODS FOR CONTROLLING INTERIOR PERMANENT MAGNET MACHINES

(75) Inventors: Long Wu, Fargo, ND (US); Robert Shaw, Moorhead, MN (US)

(73) Assignee: Deere & Company, Moline, IL (US)

( * ) Notice: Subject to any disclaimer, the term of this patent is extended or adjusted under 35 U.S.C. 154(b) by 284 days.

(21) Appl. No.: 13/036,513

(22) Filed: Feb. 28, 2011

(65) Prior Publication Data

US 2012/0217911 A1 Aug. 30, 2012

(51) Int. Cl.
H02P 6/14 (2006.01)

(52) U.S. Cl.
USPC .............. 318/400.3; 318/400.07; 318/400.22

(58) Field of Classification Search
USPC .............. 318/400.02, 63, 254, 432, 474, 634, 318/599, 701, 757, 762, 811, 400.3, 400.07, 318/400.22
See application file for complete search history.

(56) References Cited

U.S. PATENT DOCUMENTS

| | | | |
|---|---|---|---|
| 4,023,083 A | 5/1977 | Plunkett | |
| 4,456,865 A * | 6/1984 | Robertson et al. | 318/599 |
| 4,814,677 A | 3/1989 | Plunkett | |
| 5,140,248 A * | 8/1992 | Rowan et al. | 318/811 |
| 5,428,283 A | 6/1995 | Kalman et al. | |
| 5,486,748 A | 1/1996 | Konrad et al. | |
| 5,914,582 A | 6/1999 | Takamoto et al. | |
| 6,275,000 B1 | 8/2001 | Nishimura | |
| 7,023,168 B1 * | 4/2006 | Patel et al. | 318/757 |
| 7,045,988 B2 | 5/2006 | Ha et al. | |
| 7,135,833 B2 * | 11/2006 | DeLange et al. | 318/762 |
| 7,157,878 B2 | 1/2007 | Collier-Hallman | |
| 7,554,276 B2 * | 6/2009 | Galli et al. | 318/109 |
| 7,573,227 B2 | 8/2009 | Kasaoka et al. | |
| 7,586,286 B2 | 9/2009 | Cheng et al. | |
| 7,595,600 B2 * | 9/2009 | Patel et al. | 318/432 |
| 7,733,044 B2 | 6/2010 | Nakamura et al. | |
| 7,906,923 B2 * | 3/2011 | Satake | 318/400.02 |
| 7,928,675 B2 * | 4/2011 | Chen | 318/400.02 |
| 8,285,451 B2 * | 10/2012 | Ta et al. | 701/41 |
| 2004/0062062 A1 * | 4/2004 | Lee et al. | 363/37 |
| 2006/0097688 A1 | 5/2006 | Patel et al. | |
| 2006/0113929 A1 * | 6/2006 | DeLange et al. | 318/63 |
| 2006/0247829 A1 | 11/2006 | Sato | |
| 2007/0063661 A1 * | 3/2007 | Galli et al. | 318/109 |
| 2008/0042606 A1 * | 2/2008 | Chen | 318/474 |
| 2008/0303475 A1 * | 12/2008 | Patel et al. | 318/634 |
| 2009/0026997 A1 * | 1/2009 | Satake | 318/701 |
| 2009/0212734 A1 | 8/2009 | Royak et al. | |
| 2009/0234538 A1 * | 9/2009 | Ta et al. | 701/41 |
| 2009/0273308 A1 | 11/2009 | Matsuo | |

OTHER PUBLICATIONS

International Search Report and Written Opinion of the International Searching Authority, dated Jun. 28, 2012.

(Continued)

*Primary Examiner* — Paul Ip

(74) *Attorney, Agent, or Firm* — Harness, Dickey & Pierce, P.L.C.

(57) ABSTRACT

Example embodiments disclose an Interior Permanent Magnet (IPM) machine system including an IPM machine including a nominal operating direct current (dc) bus voltage, and a controller configured to detect an operating dc bus voltage of the IPM machine and to control the IPM machine based on the nominal operating dc bus voltage and the detected operating dc bus voltage.

18 Claims, 6 Drawing Sheets

(56) References Cited

OTHER PUBLICATIONS

M.E. Haque et al., "Improved Trajectory Control for an Interior Permanent Magnet Synchronous Motor Drive With Extended Operating Limit" School of Electrical Engineering and Telecommunication, University of New South Wales, Sydney, Australia, whole document.

J.L. Kirtley Jr., "Class Notes Chapter 12: Permanent Magnet "Brushless DC" Motors" 6.061 Introduction to Power Systems, Massachusetts Institute of Technology, Department of Electrical Engineering and Computer Science, Feb. 5, 2003, whole document.

M. Elbuluk and M. Kankam, "Speed Sensorless Induction Motor Devices for Electrical Actuators: Schemes, Trends and Tradeoffs," National Aerospace and Electronics Conference cosponsored by IEEE, Wright-Patterson AFB, Dayton, OH, Jul. 14-18, 1997.

S. Van Haute et al., "Design and Control of a Permanent Magnet Synchronous Motor Drive for a Hybrid Electric Vehicle," Katholieke University Leauven, Belgium.

US 7,595,604, 09/2009, Tomigashi (withdrawn).

\* cited by examiner

INTERIOR PERMANENT MAGNET MACHINE SYSTEMS AND METHODS FOR CONTROLLING INTERIOR PERMANENT MAGNET MACHINES

FIELD

Example embodiments are related to electronic drive device systems and methods for controlling electronic drive devices such as Interior Permanent Magnet (IPM) motors or machines.

BACKGROUND

IPM motor control has voltage limitations ranging from medium to high speeds. A specific direct current (dc) bus voltage level determines a series of best operating trajectories for a batch of rotor speeds. IPM characterization is normally performed only at the nominal dc bus voltage level. In other words, motor operating points, which generate direct and quadrature (d-q) current commands from a controller lookup table, are calibrated only at the nominal dc bus voltage level for a batch of rotor speeds.

In real IPM machine applications, an operating dc bus voltage may fluctuate significantly, cycling through motoring and braking modes, especially with battery applications. The fluctuating operating dc bus voltage may impact current regulation at lower dc bus voltages.

SUMMARY

Example embodiments are directed to IPM machine systems and methods of controlling IPM machines.

The inventors have discovered that if an operating dc bus voltage is boosted from motor regeneration such that it is higher than a nominal dc bus voltage, IPM motor control should utilize the boosted dc bus voltage in order to increase output torque, power and improve/or efficiency. If the operating dc bus voltage is lower than the nominal dc bus voltage, motor operating points corresponding to the operating dc bus voltage are adjusted to ensure robust current control.

Example embodiments utilize a dc bus voltage to determine a series of operating trajectories for a batch of rotor speeds. In other words, example embodiments efficiently operate an IPM motor with a varying dc bus voltage. In some example embodiments the IPM motor is operated while using only nominal voltage characterization data.

An example embodiment discloses an IPM machine system including an IPM machine including a nominal operating direct current (dc) bus voltage, and a controller configured to detect an operating dc bus voltage of the IPM machine and to control the IPM machine based on the nominal operating dc bus voltage and the detected operating dc bus voltage.

At least another example embodiment discloses a method of controlling an IPM machine. The method includes determining an operating dc bus voltage of the IPM machine and a nominal dc bus voltage of the IPM machine, subsequently determining a drive command based on the operating dc bus voltage of the IPM machine and the nominal dc bus voltage of the IPM machine, and outputting the determined drive command to the IPM machine.

At least another example embodiment discloses an IPM machine system including an IPM machine and a controller configured to detect an operating dc bus voltage and operating rotor shaft speed of the IPM machine, determine a ratio of the detected operating dc bus voltage to the detected operating rotor shaft speed and control the IPM machine based on the determined ratio.

BRIEF DESCRIPTION OF THE DRAWINGS

Example embodiments will be more clearly understood from the following detailed description taken in conjunction with the accompanying drawings. FIGS. 1-5B represent non-limiting, example embodiments as described herein.

FIG. 1 is a block diagram of an example embodiment of a system for controlling an electrical motor;

FIG. 2 is a block diagram of an electronic data processing system consistent with FIG. 1;

FIG. 3 illustrates an example embodiment of a calculation module shown in FIG. 1;

FIG. 4 illustrates an example embodiment of a current generation manager shown in FIG. 1; and FIGS. 5A-5B illustrate a method of controlling an IPM machine according to an example embodiment.

DETAILED DESCRIPTION

Figure 1:
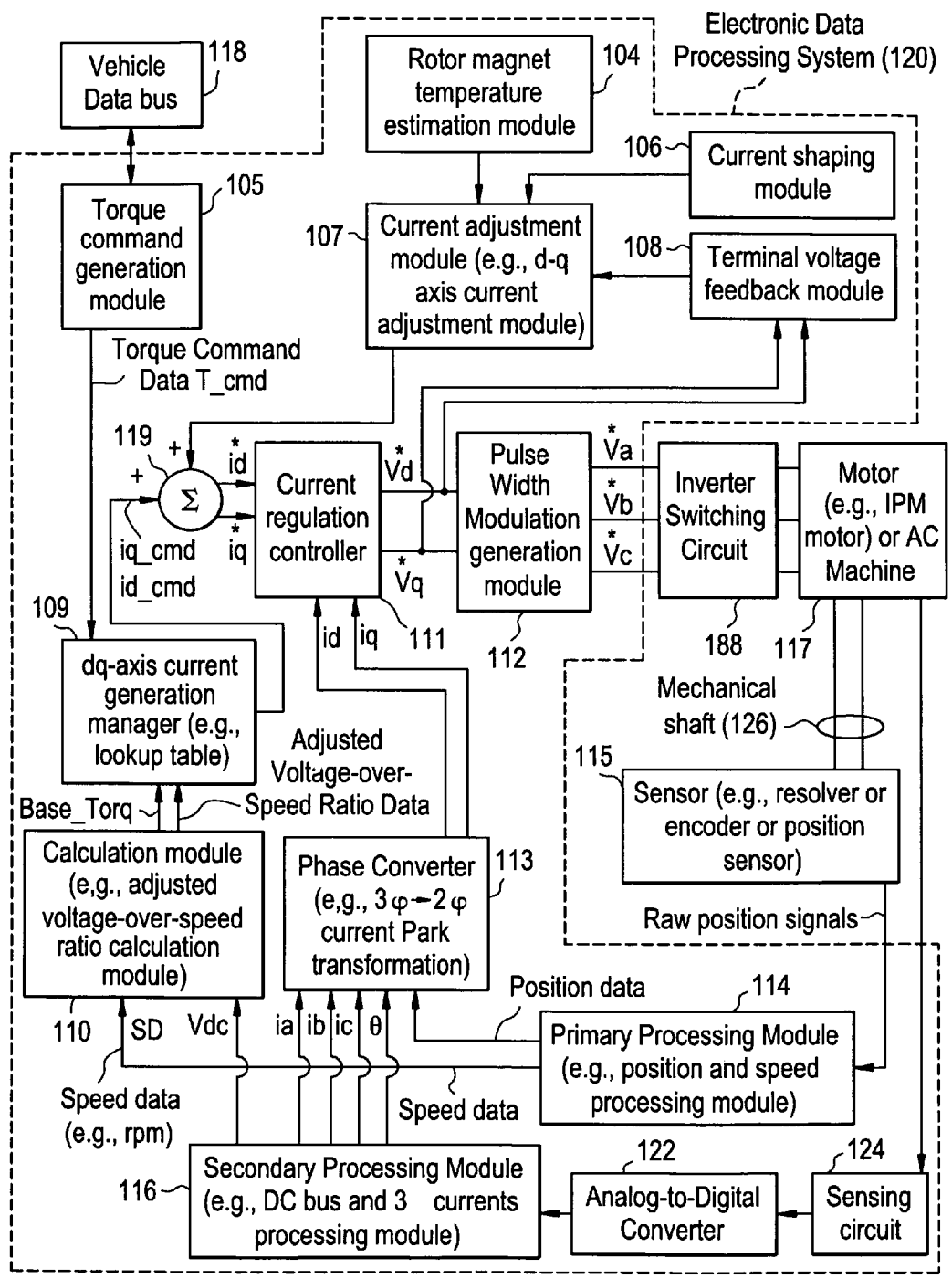

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

In accordance with an example embodiment, FIG. 1 discloses a system for controlling an IPM machine such as a motor 117 (e.g., an interior permanent magnet (IPM) motor) or another alternating current machine. The motor 117 has a nominal dc bus voltage (e.g., 320 Volts). The nominal voltage is a named voltage. For example, a nominal voltage of the motor 117 may be 320 Volts, but the motor may operate at a voltage above and below 320 Volts. In an example embodiment, the system, aside from the motor 117, may be referred to as an inverter or a motor controller. The system for controlling the motor 117 may also be referred to as an IPM machine system.

The system includes electronic modules, software modules, or both. In an example embodiment, the motor controller includes an electronic data processing system 120 to support storing, processing or execution of software instructions of one or more software modules. The electronic data processing system 120 is indicated by the dashed lines in FIG. 1 and is shown in greater detail in FIG. 2. The electronic data processing system 120 may also be referred to as a controller for the motor 117.

The data processing system 120 is coupled to an inverter circuit 188. The inverter circuit 188 includes a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as phase current values ia, ib and ic), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

In an example embodiment, a torque command generation module 105 is coupled to a d-q axis current generation manager 109 (e.g., d-q axis current generation look-up tables). The d-q axis current refers to the direct axis current and the quadrature axis current as applicable in the context of vector-controlled alternating current machines, such as the motor 117. The output of the d-q axis current generation manager 109 (d-q axis current commands iq_cmd and id_cmd) and the output of a current adjustment module 107 (e.g., d-q axis current adjustment module 107) are fed to a summer 119. In turn, one or more outputs (e.g., direct axis current data (id*) and quadrature axis current data (iq*)) of the summer 119 are provided or coupled to a current regulation controller 111. While the term current command is used, it should be understood that current command refers to a target current value.

The current regulation controller 111 is capable of communicating with the pulse-width modulation (PWM) generation module 112 (e.g., space vector PWM generation module). The current regulation controller 111 receives respective adjusted d-q axis current commands (e.g., id* and iq*) and actual d-q axis currents (e.g., id and iq) and outputs corresponding d-q axis voltage commands (e.g., vd* and vq* commands) for input to the PWM generation module 112.

In an example embodiment, the PWM generation module 112 converts the direct axis voltage and quadrature axis voltage data from two phase data representations into three phase representations (e.g., three phase voltage representations, such as va*, vb* and vc*) for control of the motor 117, for example. Outputs of the PWM generation module 112 are coupled to the inverter circuit 188.

The inverter circuit 188 includes power electronics, such as switching semiconductors to generate, modify and control pulse-width modulated signals or other alternating current signals (e.g., pulse, square wave, sinusoidal, or other waveforms) applied to the motor 117. The PWM generation module 112 provides inputs to a driver stage within the inverter circuit 188. An output stage of the inverter circuit 188 provides a pulse-width modulated voltage waveform or other voltage signal for control of the motor 117. In an example embodiment, the inverter 188 is powered by a direct current (dc) voltage bus.

The motor 117 is associated with the sensor 115 (e.g., a resolver, encoder, speed sensor, or another position sensor or speed sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In an example embodiment, the sensor 115 may be coupled to an analog-to-digital converter (not shown) that converts analog raw position data or velocity data to digital raw position or velocity data, respectively. In other example embodiments, the sensor 115 (e.g., digital position encoder) may provide a digital data output of raw position data or velocity data for the motor shaft 126 or rotor.

A first output (e.g., position data θ for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data SD for the motor 117) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (dc) bus (e.g., high voltage dc bus which may provide dc power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., dc bus voltage and three phase current processing module). For example, the sensing circuit 124 is associated with the motor 117 for measuring three phase currents (e.g., current applied to the windings of the motor 117, back EMF (electromotive force) induced into the windings, or both).

Certain outputs of the primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data ia, ib and ic from the secondary processing module 116 and position data θ from the sensor 115. The output of the phase converter 113 module (id, iq) is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide the speed data SD (e.g., motor shaft 126 speed in revolutions per minute), whereas the secondary processing module 116 may provide a measured (detected) level of the operating dc bus voltage Vdc of the motor 117 (e.g., on the dc bus of a vehicle). The dc voltage level on the dc bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the d-q axis current generation manager 109. The output of the calculation module 110 can adjust or impact the current commands iq_cmd and id_cmd generated by the d-q axis current generation manager 109 to compensate for fluctuation or variation in the dc bus voltage, among other things.

The rotor magnet temperature estimation module 104, the current shaping module 106, and the terminal voltage feedback module 108 are coupled to or are capable of communicating with the d-q axis current adjustment module 107. In turn, the d-q axis current adjustment module 107 may communicate with the d-q axis current generation manager or the summer 119.

The rotor magnet temperature estimation module 104 estimates or determines the temperature of the rotor permanent magnet or magnets. In an example embodiment, the rotor magnet temperature estimation module 104 may estimate the temperature of the rotor magnets from, one or more sensors located on the stator, in thermal communication with the stator, or secured to the housing of the motor 117.

In another example embodiment, the rotor magnet temperature estimation module 104 may be replaced with a temperature detector (e.g., a thermistor and wireless transmitter like infrared thermal sensor) mounted on the rotor or the magnet, where the detector provides a signal (e.g., wireless signal) indicative of the temperature of the magnet or magnets.

In an example embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data T_cmd.

The d-q axis current generation manager 109 selects or determines the direct axis current command and the quadrature axis current command associated with respective torque control command data and respective detected motor shaft 126 speed data SD. For example, the d-q axis current generation manager 109 selects or determines the direct axis current command and the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data SD for the motor shaft 126, where the primary processing module 114 may convert raw position data provided by the sensor 115 into speed data SD.

The current adjustment module 107 (e.g., d-q axis current adjustment module) provides current adjustment data to adjust the direct axis current command id_cmd and the quadrature axis current command iq_cmd based on input data from the rotor magnet temperature estimation module 104, the current shaping module 106, and terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on controller voltage command versus voltage limit. The current adjustment module 107 may provide an aggregate current adjustment that considers one or more of the following adjustments: a preliminary adjustment, a secondary adjustment, and a third adjustment.

In an example embodiment, the motor 117 may include an interior permanent magnet (IPM) machine or a synchronous IPM machine (IPMSM).

The sensor 115 (e.g., shaft or rotor speed detector) may include one or more of the following: a direct current motor, an optical encoder, a magnetic field sensor (e.g., Hall Effect sensor), magneto-resistive sensor, and a resolver (e.g., a brushless resolver). In one configuration, the sensor 115 includes a position sensor, where raw position data and associated time data are processed to determine speed or velocity data for the motor shaft 126. In another configuration, the sensor 115 includes a speed sensor, or the combination of a speed sensor and an integrator to determine the position of the motor shaft.

In yet another configuration, the sensor 115 includes an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 includes an optical encoder with an optical source that transmits a signal toward a rotating object coupled to the motor shaft 126 and receives a reflected or diffracted signal at an optical detector, where the frequency of received signal pulses (e.g., square waves) may be proportional to a speed of the motor shaft 126. In an additional configuration, the sensor 115 includes a resolver with a first winding and a second winding, where the first winding is fed with an alternating current, where the voltage induced in the second winding varies with the frequency of rotation of the rotor.

Figure 2:
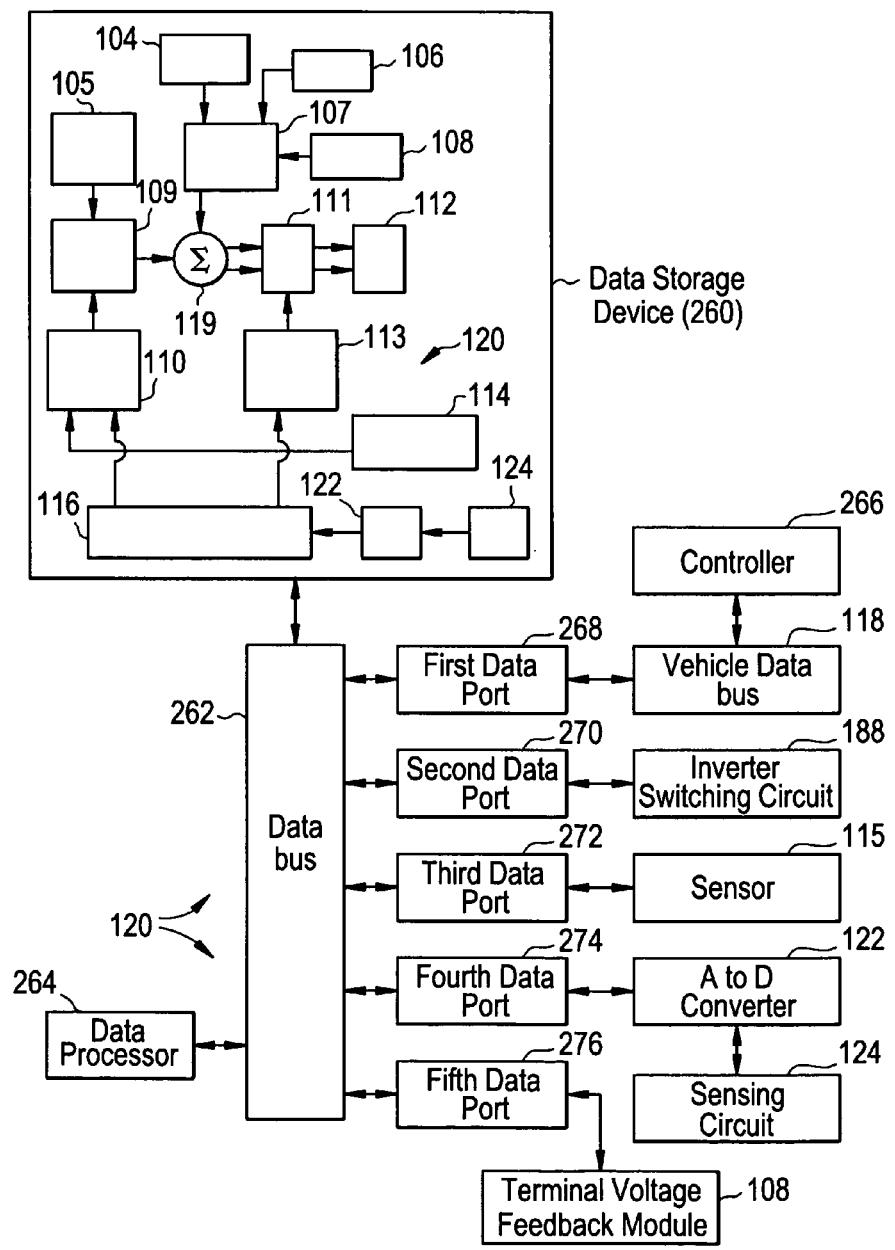

In FIG. 2, the electronic data processing system 120 includes an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like.

As shown in FIG. 2, the data ports include a first data port 268, a second data port 270, a third data port 272, a fourth data port 274 and a fifth data port 276, although any suitable number of data ports may be used. Each data port may include a transceiver and buffer memory, for example. In an example embodiment, each data port may include any serial or parallel input/output port.

In an example embodiment as illustrated in FIG. 2, the first data port 268 is coupled to the vehicle data bus 118. In turn, the vehicle data bus 118 is coupled to a controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In an example embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, the controller 266, or other control device.

In some example embodiments, the sensor 115 and the primary processing module 114 may be associated with or supported by a third data port 272 of the data processing system 120.

IPM Machine Control

Steady state voltage equations for an IPM motor according to example embodiments may be:

$$v_d = r_s i_d - \omega_e L_q i_q \quad (1)$$

$$v_q = r_s i_q + \omega_e L_d i_d + \omega_e \lambda_f \quad (2)$$

wherein $v_d$ is the d-axis voltage, $v_q$ is the q-axis voltage, $r_s$ is the stator resistance, $i_d$ is the d-axis current, $i_q$ is the q-axis current, $L_d$ is the d-axis inductance, $L_q$ is the q-axis inductance, $\omega_e$ is the electrical frequency of the IPM and $\lambda_f$ is the strength of the permanent magnet on the rotor of the IPM.

The stator resistance $r_s$ may be neglected because a voltage drop across a resistance item is much smaller than a voltage drop across an inductance item and a back EMF item (e.g., $\lambda_f$). If the stator resistance $r_s$ is neglected, equations (1) and (2) can be rewritten as follows:

$$\frac{v_d}{\omega_e} = -L_q i_q \quad (3)$$

$$\frac{v_q}{\omega_e} = L_d i_d + \lambda_f \quad (4)$$

Therefore, equations (3) and (4) indicate ratios of an available terminal voltage over motor electrical frequency to determine the operating points for the current commands iq_cmd and id_cmd, assuming the strength of the permanent magnet $\lambda_f$ and the inductances $L_d$ and $L_q$ are all constants. The electrical frequency can be converted from rotor shaft speed in rpm. The terminal voltage may be referred to as the alternating current (ac) voltage applied at a terminal of a machine such as the motor 117. For example, the dc bus voltage may be converted to the terminal voltage by the inverter switching circuit 188.

Specifically, the voltage over speed ratio can be calculated by dividing the operating dc bus voltage over operating rotor shaft speed in rpm.

For example, an operating trajectory calibrated at 5000 rpm at 325 V can be directly applied to 4615.4 rpm at 300 V or 5384.6 rpm at 350 V. Note that, the smaller the calculated ratio value, the more stringent the applied terminal voltage limitation. The terminal voltage limitation is a maximum available output ac voltage generated from a dc bus voltage for a machine terminal at high speed heavy load conditions. For a robust motor operation, a controller may require an additional voltage margin. For example, the voltage margin is based on the permanent magnet strength change due to ambient temperature change, fast dynamics of torque command and dc bus voltage. Thus, the voltage margin may be set according to these factors.

As an example, the actual voltage limit may be 90-95% (e.g., 92%) of the terminal voltage limitation.

However, the permanent magnet strength $\lambda_f$ is a function of rotor speeds due to the varying machine iron losses and rotor magnet heating effects. The varying magnet strength $\lambda_f$ will further cause variation in the d-q axis inductances $L_d$ and $L_q$. Hence, while the combinations of operating dc bus voltage and operating rotor shaft speed yield the same ratio values, optimized operating points may still be different considering varying machine parameters such as back EMF strength and d-q axis inductances.

To compensate for the varying magnet strength effects in example embodiments, a voltage compensation coefficient adjusts the calculated voltage over speed ratio values. At the nominal dc bus level, the voltage compensation coefficient can be adjusted to reflect a voltage margin, depending on an application's dynamic response specification.

When the operating dc bus voltage is higher than the nominal dc bus voltage, the voltage compensation coefficient is set slightly higher considering weaker magnet strength for higher rotor speed. On the other hand, when the operating dc bus voltage is lower than nominal dc bus voltage, the voltage compensation coefficient shall be set slightly lower considering stronger magnet strength for lower operating rotor shaft speed.

For the purposes of explanation, there are three sets of operating dc bus voltages and operating rotor shaft speeds: $V_1$ and $rpm_1$, $V_2$ and $rpm_2$, $V_3$ and $rpm_3$, where $V_1 < V_2 < V_3$ and $rpm_1 < rpm_2 < rpm_3$, such that the operating dc bus voltage to operating rotor shaft speed ratios are as follows:

$$\frac{V_1}{rpm_1} = \frac{V_2}{rpm_2} = \frac{V_3}{rpm_3} \qquad (5)$$

While only three sets of operating dc bus voltages and operating rotor shaft speeds are used for explanation purposes, it should be understood than any number of sets of operating dc bus voltages and operating rotor shaft speeds may be used.

In general, the magnet strength $\lambda_f$ gets smaller as speed goes up due to increased iron losses and magnet heating. Therefore, $$\lambda_f(rpm_1) > \lambda_f(rpm_2) > \lambda_f(rpm_3) \qquad (6)$$

In other words, the terminal voltage limitation will be tightest when the operating dc bus voltage is at $V_1$ with the operating rotor shaft speed at $rpm_1$ and loosest when the operating dc bus voltage is at $V_3$ with the operating rotor shaft speed at $rpm_3$. The terminal voltage is loosest at $V_1$ because the back EMF strength is strongest at $rpm_1$ and weakest at $rpm_3$. To compensate for the varying magnet strength $\lambda_f$ effects, a voltage compensation coefficient $\eta_m$ is included to adjust the calculated operating dc bus voltage to operating rotor shaft speed ratio values such that $$\frac{V_1}{rpm_1} \cdot \eta_1 < \frac{V_2}{rpm_2} \cdot \eta_2 < \frac{V_3}{rpm_3} \cdot \eta_3 \qquad (7)$$

Assuming $V_2$ is the nominal dc bus voltage used in the motor characterization procedure, then the voltage compensation coefficient 112 is varied to adjust voltage margin depending on application's dynamic response specification. The value of the voltage compensation coefficient $\eta_1$ is set less than the voltage compensation coefficient $\eta_2$ to reflect an increased magnet strength $\lambda_f$ effect at a lower speed. Similarly, the value of the voltage compensation coefficient $\eta_3$ is set slightly larger than the voltage compensation coefficient $\eta_2$ for a decreased magnet strength $\lambda_f$ at a higher speed. These selected values for the voltage compensation coefficients $\eta_1$, $\eta_2$ and $\eta_3$ are based on machine design and are determined by the tuning procedure described below.

Motor characterization procedure is a procedure used to determine d-axis and q-axis commands for a specific speed and torque command. The procedure is repeated at multiple torque commands and multiple speeds. A motor characterization procedure is described in application Ser. No. 13/036,286, entitled "METHOD AND APPARATUS FOR CHARACTERIZING AN INTERIOR PERMANENT MAGNET," by the inventors of the subject application, filed on Feb. 28, 2011, the entire contents of which are hereby incorporated by reference.

For example, machine characterization may be performed under a nominal dc bus voltage level only, such as 320 V, and at a set of rotor shaft speeds. For a particular speed such as 5000 rpm, the voltage and speed combination together gives an operating dc bus voltage to operating rotor shaft speed ratio value of 320/5000.

For the same ratio value, there are different voltages and shaft speed combinations like 280/4375, 390/6094, etc., when the operating dc bus voltage is not at the nominal dc bus voltage. If machine parameter variations such as magnet strength and d-q axis inductances are not considered, then all operating dc bus voltage and operating rotor shaft speed combinations producing the same ratio shall have exactly same operating condition in terms of voltage margin concern.

In example embodiments, the voltage margin is a percentage of the nominal dc bus voltage such as 5% or 6%. For example, a maximum available ac voltage from the dc bus is the operating dc bus voltage divided by $\sqrt{2}$ in linear modulation range. Then the voltage margin may be within 5% or 6% of the nominal dc bus voltage divided by $\sqrt{2}$.

Unfortunately, machine parameters, especially the permanent magnet strength $\lambda_f$, vary with respect to rotor shaft speeds. For example, 280 V and 4375 rpm will have a tighter voltage margin than 320 V and 5000 rpm for the same torque or current commands due to the stronger magnet strength $\lambda_f$ at 4375 rpm. Similarly, 390 V and 6094 rpm will have a looser voltage margin than 320 V & 5000 rpm for the exactly torque or current commands due to the weaker magnet strength $\lambda_f$ at 6094 rpm. In other words, as a strength of the permanent magnet increases, the back EMF voltage component increases. Therefore, the terminal ac voltage is higher and makes the voltage margin smaller.

A two-dimensional voltage compensation coefficient lookup table is constructed based on the tuning of operating dc bus voltages and operating rotor shaft speed pairs that produce the same ratio to achieve the same voltage margin. The threshold voltage margin is determined at the nominal dc bus voltage and associated operating rotor shaft speeds for the same torque command.

For example, the operating dc bus voltage may be adjusted to 280 V and the shaft speed may be adjusted to 4375 rpm. For a torque command for the operating dc bus voltages and operating rotor shaft speed pairs, the voltage compensation coefficient may be tuned, e.g., to 0.97, until the voltage margin is achieved. In other words, the voltage compensation coefficient is determined such that the adjusted ratio at 280 V and 4375 rpm operation condition associated with a torque command generates a set of d-q axis current commands that have the same voltage margin as the 320 V and 5000 rpm operation condition associated with the same torque command. The set voltage margin can 320 V divided by $\sqrt{2}$ and then multiplied by 5%.

Similarly, the operating dc bus voltage may be adjusted to 390 V and the shaft speed may be adjusted to 6094 rpm. For the same torque command, the voltage compensation may be tuned, e.g., to 1.03, until the set voltage margin is achieved as well.

The tuning procedure is repeated at different operating dc bus voltage levels such as 280, 290, . . . , 320, . . . , 380, 390 V to determine corresponding voltage compensation coefficients and put them into the two-dimensional voltage compensation coefficient lookup table.

Thus, the voltage compensation coefficients become a two-dimensional lookup table ranging from minimum operating dc bus voltage to maximum operating dc bus voltage. The two-dimensional voltage compensation coefficient lookup table is shown as 310 in FIG. 3.

Figure 3:
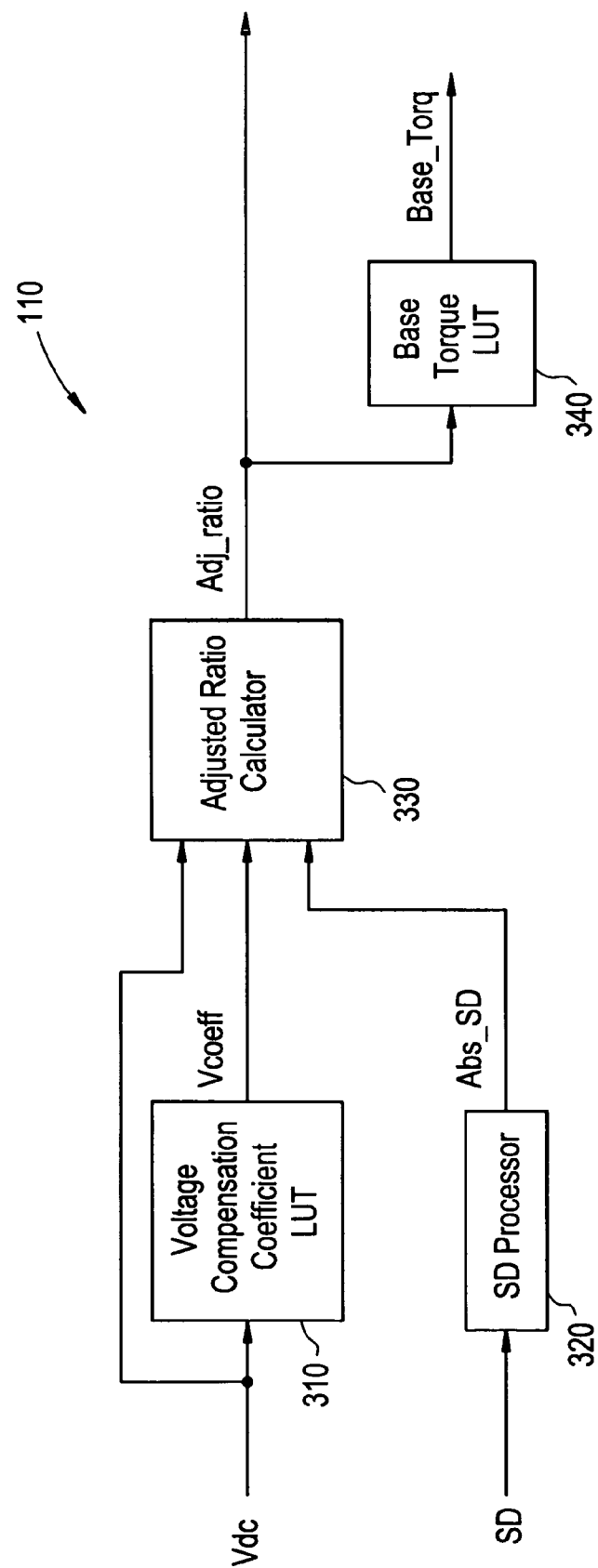

FIG. 3 illustrates an example embodiment of a calculation module shown in FIG. 1. As shown, the calculation module 110 is configured to receive the detected operating dc bus voltage value Vdc and the speed data SD (in rpm). The calculation module 110 includes the two-dimensional voltage compensation coefficient lookup table (LUT) 310, a speed data processor 320, an adjusted ratio calculator 330 and a base torque LUT 340.

The voltage compensation coefficient LUT 310 receives the detected operating dc bus voltage value Vdc and outputs a voltage compensation coefficient V coeff based on the detected operating dc bus voltage value Vdc. More specifically, the voltage compensation coefficient LUT 310 includes a list of operating dc bus voltages, each of which is associated with a voltage compensation coefficient. The voltage compensation coefficients are determined using the tuning procedure described above. When the voltage compensation coefficient LUT 310 receives the detected operating dc bus voltage value Vdc, the voltage compensation coefficient LUT 310 outputs the voltage compensation coefficient associated with the received detected operating dc bus voltage value Vdc as the voltage compensation coefficient V coeff.

The voltage compensation coefficient V coeff is output from the voltage compensation coefficient LUT 310 to the adjusted ratio (adjusted detected operating dc bus voltage to the detected operating rotor shaft speed ratio) calculator 330.

The SD processor 320 is configured to receive the speed data SD, determine the absolute value of the speed data SD and output the absolute value of the speed data Abs_SD to the adjusted ratio calculator 330. The SD processor 320 may include an SD limiter that is configured to determine whether the speed data SD exceeds or is below a threshold and, therefore, should not be considered.

In addition to receiving the voltage compensation coefficient V coeff and the absolute value of the speed data Abs_SD, the adjusted ratio calculator 330 is configured to receive the detected operating dc bus voltage value Vdc. The adjusted ratio calculator 330 adjusts the detected operating dc bus voltage to the detected operating rotor shaft speed ratio as follows:

$$\text{Adj\_ratio} = (Vdc * V\text{coeff}) / \text{Abs\_SD} \qquad (8)$$

where Adj_ratio is the adjusted detected operating dc bus voltage to the detected operating rotor shaft speed ratio. The adjusted ratio Adj_ratio is output by the adjusted ratio calculator 330 to the d-q axis current generation manager 109 and the base torque LUT 340.

The base torque LUT 340 determines a base torque value Base_Torq based on the adjusted ratio Adj_ratio and characterized base torque data associated with adjusted ratio values.

From the motor characterization data, base torque values are respectively associated with discrete speed points with a nominal dc bus voltage level. In other words, the two-dimensional base torque LUT 340 is established from the motor characterization procedure. During the IPM motor characterization procedure, each rotor shaft speed has a maximum output torque which is defined as the base torque at that speed. Thus, the base torque may also be referred to a peak torque.

The base torque LUT 340 outputs the associated base torque value as the base torque value Base_Torq to the d-q axis current generation manager 109.

Figure 4:
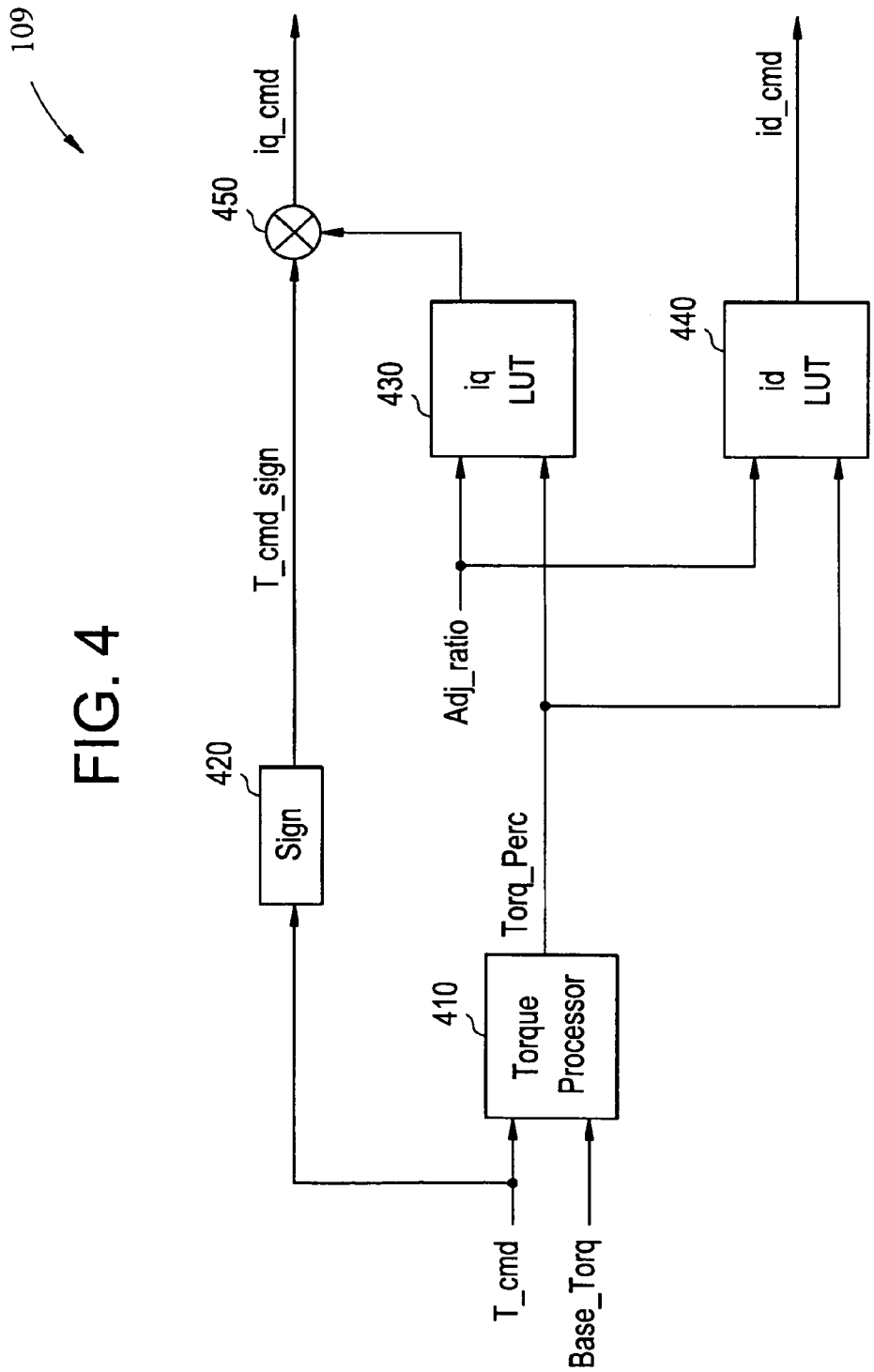

FIG. 4 illustrates an example embodiment of a current generation manager shown in FIG. 1. As shown, the d-q axis current generation manager 109 includes a torque processor 410, a sign determination unit 420, a q-axis current (iq) command LUT 430, a d-axis current (id) command LUT 440 and a multiplier 450.

The sign determination unit 420 determines the positive or negative sign of the torque command data T_cmd and outputs a sign value T_cmd_sign to the multiplier 450.

The torque processor 410 receives the base torque value Base_Torq and the torque command data T_cmd. The torque command data T_cmd may be generated from a voltage (or speed) control proportional-integrator (PI) that regulates the dc bus voltage (or speed) or from a direct torque command in a torque control mode. The torque command data T_cmd may be in Nm.

The torque processor 410 is configured to determine an absolute value of the torque command data T_cmd. The torque processor 410 is configured to convert the absolute value of the torque command data T_cmd into a percentage Torq_Perc of the base torque value Base_Torq. The torque processor 410 outputs the percentage Torq_Perc to the q-axis current (iq) command LUT 430 and the d-axis current (id) command LUT 440.

The q-axis current (iq) command LUT 430 and the d-axis current (id) command LUT 440 are also configured to receive the adjusted ratio Adj_ratio. The q-axis current (iq) command LUT 430 and the d-axis current (id) command LUT 440 store q-axis and d-axis current commands, respectively, each of which is associated with a pair of adjustment ratio and torque percentage values. The development of the q-axis current (iq) command LUT 430 and the d-axis current (id) command LUT 440 are described in application Ser. No. 13/036,286, entitled "METHOD AND APPARATUS FOR CHARACTERIZING AN INTERIOR PERMANENT MAGNET," by the inventors of the subject application, filed on Feb. 28, 2011, the entire contents of which are hereby incorporated by reference.

The d-axis current command LUT 440 is configured to output a d-axis current command id_cmd that is associated with the received torque percentage Torq_Perc and adjusted ratio Adj_ratio. As shown in FIG. 1, the d-axis current command id_cmd is output to the summer 119.

The q-axis current command LUT 430 is configured to output an initial q-axis current command that is associated with the received torque percentage Torq_Perc and adjusted ratio Adj_ratio. The initial q-axis current command is output to the multiplier 450 where the initial q-axis current command is multiplied with the sign of the torque command data T_cmd to generate the q-axis current command iq_cmd. As shown in FIG. 1, the q-axis current command iq_cmd is output to the summer 119.

Figure 5A:
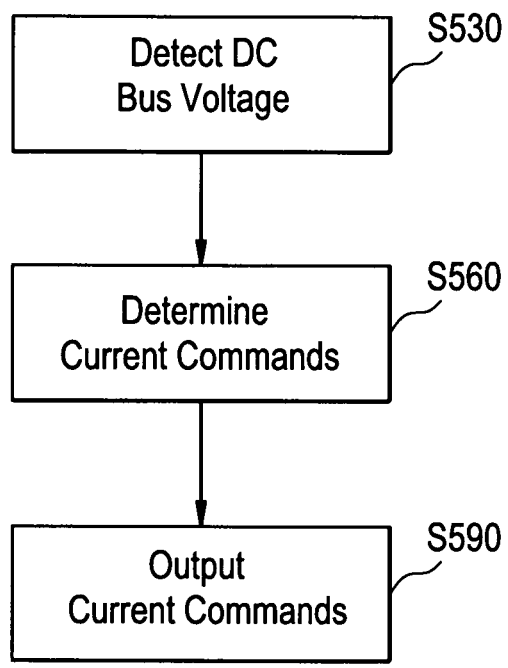
Figure 5B:
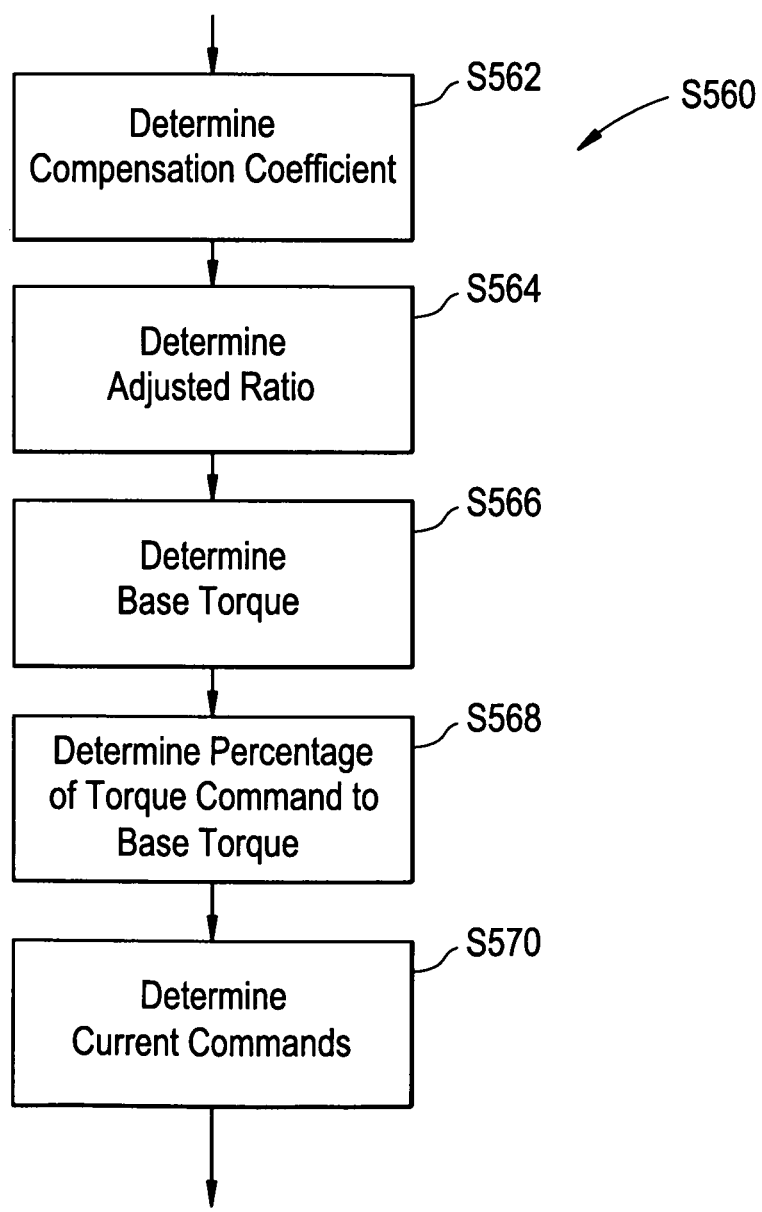

FIGS. 5A-5B illustrate a method of controlling an IPM machine according to an example embodiment. The data processing system 120 is configured to implement the methods shown in FIGS. 5A-5B.

At S530, the data processing system detects an operating dc bus voltage of the IPM machine (e.g., the motor 117). Based on the dc bus voltage, the data processing system is configured to determine a difference between the operating dc bus voltage and a nominal dc bus voltage of the electronic device.

At S560, the data processing system subsequently determines current commands (drive command) based on the determined difference between an operating dc bus voltage of the IPM machine and a nominal dc bus voltage of the IPM machine. For example, as described above, the calculation module 110 and the d-q axis current generation manager 109 are configured to determine the d-axis and q-axis current commands id_cmd and iq_cmd.

At S590, the current commands are output to the electronic device. For example, based on the d-axis and q-axis current commands id_cmd and iq_cmd, the motor 117 is driven by the data processing system 120.

FIG. 5B illustrates an example embodiment of determining current commands at S560. At S562, the data processing system determines a voltage compensation coefficient based on the detected operating dc bus voltage. At S564, the data processing system adjusts a ratio of the detected operating dc bus voltage to a detected operating rotor shaft speed by multiplying the ratio by the voltage compensation coefficient. For example, as described with reference to FIG. 3, the adjusted ratio calculator 330 calculates the adjusted ratio adj_ratio based on the voltage coefficient V_coeff and the operating dc bus voltage Vdc.

At S566, the data processing system determines a base torque based on the adjusted ratio of the detected operating dc bus voltage to a detected operating rotor shaft speed. At S568, the data processing system determines a torque command as a percentage of the base torque. Based on the percentage and the adjusted ratio, the data processing system determines the current commands at S570.

As described above, the inventors have discovered that if a dc bus voltage is boosted from motor regeneration such that it is higher than a nominal bus voltage, IPM motor control should utilize the boosted dc bus voltage in order to increase output torque, power and improve/or efficiency. If the operating dc bus voltage is lower than the nominal dc bus voltage, motor operating points corresponding to the operating dc bus voltage are adjusted to ensure robust current control.

Example embodiments utilize a dc bus voltage to determine a series of operating trajectories for a batch of rotor speeds. In other words, example embodiments efficiently operate an IPM motor with a varying dc bus voltage. In some example embodiments the IPM motor is operated while using only nominal voltage characterization data.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. An Interior Permanent Magnet (IPM) machine system comprising:
   an IPM machine including a nominal operating direct current (dc) bus voltage; and
   a controller configured to detect an operating dc bus voltage of the IPM machine and to control the IPM machine based the nominal operating dc bus voltage and the detected operating dc bus voltage, wherein the controller is configured to detect an operating rotor shaft speed of the IPM machine, determine a ratio of the detected operating dc bus voltage to the detected operating rotor shaft speed and control the IPM machine based on the determined ratio.

2. The IPM machine system of claim 1, wherein the controller is configured to control the IPM machine based on a compensation coefficient associated with the determined ratio.

3. The IPM machine system of claim 2, wherein the controller is configured to adjust the determined ratio by multiplying the compensation coefficient with the determined ratio, the adjusted ratio representing a variation of parameters of the IPM machine at different rotor shaft speeds.

4. The IPM machine system of claim 1, wherein the controller is configured to generate a set of direct axis and quadrature axis current commands to control an output torque of the IPM machine based on the determined ratio.

5. The IPM machine system of claim 4, wherein the controller includes,
   a first processing unit configured to detect the operating dc bus voltage and three phase currents of the IPM machine,
   a second processing unit configured to detect an angular rotor shaft position of the IPM machine and an operating rotor shaft speed of the IPM machine, and
   a calculation unit configured to determine a ratio of the detected operating dc bus voltage to the detected operating rotor shaft speed, the set of direct-axis and quadrature-axis current commands being based on the determined ratio.

6. The IPM machine system of claim 5, wherein the controller includes,
   two three-dimensional lookup tables configured to determine the set of direct-axis and quadrature-axis current commands based on the determined ratio.

7. The IPM machine system of claim 5, wherein the controller includes,
a look-up table configured to store a plurality of compensation coefficients, each respectively associated with an operating dc bus voltage, the set of direct-axis and quadrature-axis current commands being based on the compensation coefficient associated with the determined ratio.

8. The IPM machine system of claim 7, wherein the look-up table is a two-dimensional look-up table.

9. The IPM machine system of claim 4, wherein the controller includes,
a first three-dimensional look-up table configured to determine the d-axis current command based on the determined ratio adjusted by the associated compensation coefficient and a torque command, and
a second three-dimensional look-up table configured to determine the q-axis current command based on the determined ratio adjusted by the associated compensation coefficient and the torque command.

10. The IPM machine system of claim 9, wherein the torque command is a percentage of a base torque.

11. The IPM machine system of claim 10, wherein the base torque is based on the determined ratio adjusted by the associated compensation coefficient.

12. The IPM machine system of claim 11, wherein the controller includes,
a two-dimensional lookup table configured to store a plurality of base torques, each respectively associated with a ratio of an operating dc bus voltage to an operating rotor shaft speed.

13. A method of controlling an Interior Permanent Magnet (IPM) machine comprising:
determining an operating dc bus voltage of the IPM machine and a nominal dc bus voltage of the IPM machine, the determining including,
determining an operating rotor shaft speed of the IPM machine;
subsequently determining a drive command based on the operating dc bus voltage of the IPM machine and the nominal dc bus voltage of the IPM machine, the subsequent determining includes,
determining a ratio between the operating dc bus voltage and the operating rotor shaft speed,
adjusting the determined ratio by multiplying an associated compensation coefficient with the determined ratio, and
determining the drive command based on the adjusted ratio; and
outputting the determined drive command to the IPM machine.

14. The method of claim 13, wherein
the subsequent determining includes,
determining a set of direct-axis and quadrature-axis current commands based on a determined difference between the operating dc bus voltage of the IPM machine and the nominal dc bus voltage of the IPM machine, and
wherein the outputting includes outputting the direct-axis and quadrature-axis current commands to the IPM machine.

15. The method of claim 13, wherein the associated compensation coefficient is based on the operating dc bus voltage.

16. The method of claim 13, wherein the subsequent determining includes,
determining a base torque based on the adjusted ratio,
receiving a true torque command value,
determining a percentage of the true torque command value compared to the base torque, and
determining the drive current commands based on the determined torque command percentage and adjusted ratio.

17. An Interior Permanent Magnet (IPM) machine system comprising:
an IPM machine; and
a controller configured to detect an operating dc bus voltage and operating rotor shaft speed of the IPM machine, determine a ratio of the detected operating dc bus voltage to the detected operating rotor shaft speed and control the IPM machine based on the determined ratio.

18. The IPM machine system of claim 17, wherein the controller is configured to,
determine a base torque based on the determined ratio,
receive a true torque command value,
determine a percentage of the true torque command value compared to the base torque, and
control the IPM machine based on the determined torque command percentage and determined ratio.

* * * * *